United States Patent
Kaplan et al.

(10) Patent No.: US 9,792,448 B2
(45) Date of Patent: Oct. 17, 2017

(54) CRYPTOGRAPHIC PROTECTION OF INFORMATION IN A PROCESSING SYSTEM

(71) Applicant: Advanced Micro Devices, Inc., Sunnyvale, CA (US)

(72) Inventors: David A. Kaplan, Austin, TX (US); Thomas Roy Woller, Austin, TX (US); Ronald Perez, Piedmont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/494,643

(22) Filed: Sep. 24, 2014

(65) Prior Publication Data

US 2015/0248357 A1     Sep. 3, 2015

Related U.S. Application Data

(60) Provisional application No. 61/946,086, filed on Feb. 28, 2014.

(51) Int. Cl.
| | | |
|---|---|---|
| G06F 21/60 | (2013.01) | |
| G06F 12/14 | (2006.01) | |
| G06F 9/455 | (2006.01) | |

(52) U.S. Cl.
CPC ........ G06F 21/602 (2013.01); G06F 9/45558 (2013.01); G06F 12/1408 (2013.01); *G06F 2009/4557* (2013.01); *G06F 2009/45587* (2013.01); *G06F 2212/402* (2013.01)

(58) Field of Classification Search
None
See application file for complete search history.

(56) References Cited

U.S. PATENT DOCUMENTS

| | | | | |
|---|---|---|---|---|
| 5,479,630 A | * | 12/1995 | Killian | ................ G06F 12/1054 |
| | | | | 711/119 |
| 7,246,245 B2 | * | 7/2007 | Twomey | ................ H04L 29/06 |
| | | | | 713/189 |
| 8,151,262 B2 | | 4/2012 | Challener et al. | |
| 8,656,482 B1 | | 2/2014 | Tosa et al. | |
| 2006/0005084 A1 | | 1/2006 | Neiger et al. | |
| 2006/0021066 A1 | | 1/2006 | Clayton et al. | |
| 2008/0126614 A1 | * | 5/2008 | Ooi | ..................... G06F 9/45558 |
| | | | | 710/38 |
| 2008/0276235 A1 | | 11/2008 | Knauerhase et al. | |

(Continued)

OTHER PUBLICATIONS

International Search Report and Written Opinion correlating to PCT/US2015/017925 dated Dec. 11, 2015, 13 pages.

(Continued)

*Primary Examiner* — Benjamin Lanier

(57) ABSTRACT

A processor employs a hardware encryption module in the processor's memory access path to cryptographically isolate secure information. In some embodiments, the encryption module is located at a memory controller (e.g. northbridge) of the processor, and each memory access provided to the memory controller indicates whether the access is a secure memory access, indicating the data associated with the memory access is designated for cryptographic protection, or a non-secure memory access. For secure memory accesses, the encryption module performs encryption (for write accesses) or decryption (for read accesses) of the data associated with the memory access.

17 Claims, 9 Drawing Sheets

(56) References Cited

U.S. PATENT DOCUMENTS

| | | |
|---|---|---|
| 2009/0086979 A1 | 4/2009 | Brutch et al. |
| 2009/0113110 A1 | 4/2009 | Chen et al. |
| 2010/0115513 A1 | 5/2010 | Moriki |
| 2010/0153749 A1* | 6/2010 | Sakai ............... G06F 21/6236 713/193 |
| 2010/0175108 A1 | 7/2010 | Protas |
| 2010/0281273 A1 | 11/2010 | Lee et al. |
| 2011/0010707 A1 | 1/2011 | Serebrin et al. |
| 2011/0246767 A1 | 10/2011 | Chaturvedi et al. |
| 2011/0302400 A1 | 12/2011 | Maino |
| 2012/0054740 A1 | 3/2012 | Chakraborty et al. |
| 2013/0097392 A1 | 4/2013 | Arges et al. |
| 2013/0111221 A1* | 5/2013 | Fujii .................... G06F 3/0604 713/193 |
| 2013/0227303 A1 | 8/2013 | Kadatch et al. |
| 2013/0247035 A1 | 9/2013 | Khanna |
| 2014/0281509 A1 | 9/2014 | Angelo et al. |
| 2015/0215120 A1 | 7/2015 | Bursell |
| 2015/0248357 A1 | 9/2015 | Kaplan et al. |

OTHER PUBLICATIONS

U.S. Appl. No. 14/748,883, filed Jun. 24, 2015, listing David Kaplan et al. as inventor(s), entitled "Protecting State Information for Virtual Machines".

Non-Final Office Action mailed Mar. 24, 2016 for U.S. Appl. No. 14/748,883, 19 pages.

International Search Report and Written Opinion correlating to PCT/US2016/038694 dated Sep. 12, 2016, 10 pages.

Final Office Action mailed Sep. 15, 2016 for U.S. Appl. No. 14/748,883, 20 pages.

International Preliminary Report on Patentability correlating to PCT/US2015/017925, IPRP dated Sep. 6, 2016, 11 pages.

U.S. Appl. No. 15/081,126, filed Mar. 25, 2016, listing Jeremy W. Powell et al. as inventors, entitled "Key Management for Secure Memory Address Spaces".

International Search Report and Written Opinion correlating to PCT/US2016/051658 dated Dec. 13, 2016, 12 pages.

Non-Final Office Action mailed May 18, 2017 for U.S. Appl. No. 14/748,883, 29 pages.

\* cited by examiner

CRYPTOGRAPHIC PROTECTION OF INFORMATION IN A PROCESSING SYSTEM

BACKGROUND

Field of the Disclosure

The present disclosure relates generally to processors and more particularly to information security at a processor.

Description of the Related Art

In many processor applications, protection of information security is an important feature. For example, a processor can be used in a server in an Infrastructure As A Service (IAAS) environment, wherein the processor executes one or more virtual machines (VMs) and executes a hypervisor to partition the server hardware among the VMs and isolate the VMs from each other. Because different VMs may be executed on behalf of different customers, it is desirable that the information (instructions and data) employed by each VM be protected from access by other VMs. Conventionally, the hypervisor maintains isolation of VM information by maintaining separate memory page tables and other logical entities for each VM. However, flaws (e.g. bugs) in the hypervisor can cause the hypervisor itself to be vulnerable to exploitation, allowing one VM to access the information of another VM. Even in more private security environments, such as a personal computer, data stored in memory modules can be subject to theft, and the data stored therein subject to unauthorized access.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
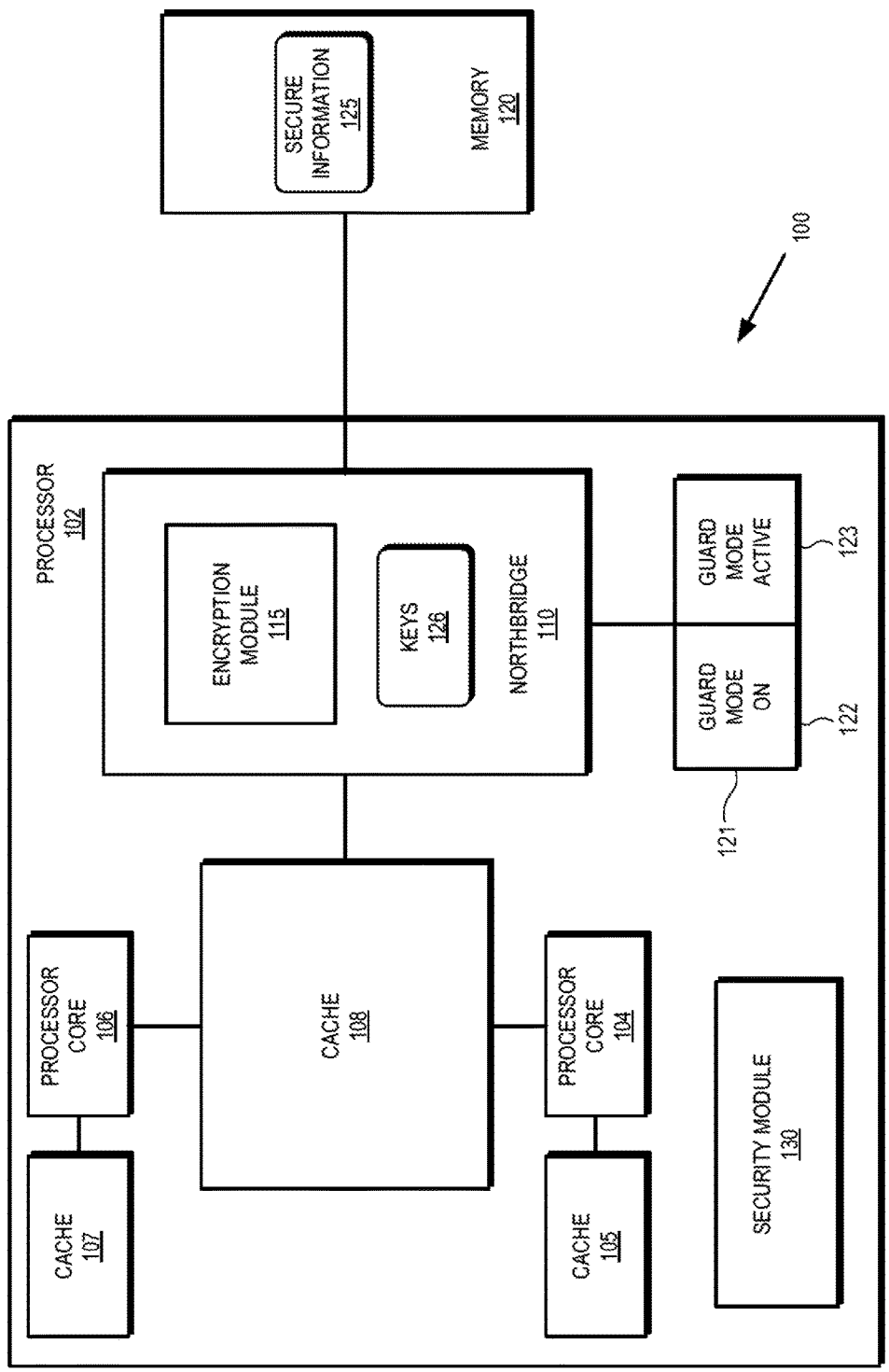
FIG. 1 is a block diagram of a processing system employing an encryption module at a memory controller for secure isolation of information in accordance with some embodiments.

FIGS. 1-11 illustrate techniques for protecting secure information at a processing system by employing a hardware encryption module in the processor's memory access path to cryptographically isolate the secure information. In some embodiments, the encryption module is located at a memory controller (e.g. northbridge) of the processor, and each memory access provided to the memory controller indicates whether the access is a secure memory access, indicating the information associated with the memory access is designated for cryptographic protection, or a non-secure memory access. For secure memory accesses, the encryption module performs encryption (for write accesses) or decryption (for read accesses) of the data associated with the memory access. Because the encryption is done by hardware in the processor's memory access path, the data stored at the memory is not meaningfully accessible without the correct encryption/decryption key.

In some embodiments the processor is employed in a processing system to execute different virtual machines (VMs), and to further execute a hypervisor to provide an interface between the VMs and the processing system's hardware, including memory. Because the VMs may be executed by distinct users (e.g. different customers), it is desirable that the VMs be isolated from each other such that one VM cannot access the information (instructions and data) employed by another VM. Conventionally, the hypervisor has been used to isolate the VMs by assigning each VM a dedicated portion of memory and other resources of the processing system for its private use. However, bugs in the hypervisor, or a hypervisor that has been maliciously modified to act as a vehicle for exploitation, can allow the hypervisor or a given VM to examine, or even alter, the information of another VM. Using the techniques described herein, the encryption module of the memory controller is employed to cryptographically protect the information of each VM from access by the hypervisor or by other executing VMs. Because the cryptographic protection is implemented in the hardware of the processor's memory access path ("below" the executing hypervisor), bugs in the hypervisor, or a malicious hypervisor, would provide access only to encrypted data that could not be understood or meaningfully interpreted.

For example, in some embodiments, the encryption module stores a unique key for each VM being executed by the processor. In some scenarios, the keys for the VMs can be generated by a security module separate from processor cores of the processing system, so that software executing at the processor cores, including the hypervisor, cannot access the keys. In response to receiving a memory access request at the memory controller, the encryption module identifies the VM that generated the request and encrypts or decrypts the data associated with the request using the requesting VM's corresponding key. The data is therefore cryptographically protected from access by the hypervisor or by other VMs. To illustrate, even if an unauthorized VM were to retrieve data stored at a memory location assigned to another VM (e.g. by exploiting a bug in the hypervisor), the data itself would be encrypted, and therefore meaningless to the unauthorized VM.

In some embodiments, the techniques described herein are implemented in a processing system employed in a physically insecure environment, wherein the processing system's memory is subject to unauthorized physical access (e.g. theft of hardware memory modules or physical probing of the memory). However, because the encryption module causes secure data to be stored at the memory in encrypted form, the secure data is not readily useful even if it is subject to unauthorized physical access.

FIG. 1 illustrates a processing system 100 that provides for cryptographic protection of information in accordance with some embodiments. The processing system 100 includes a processor 102 and a memory 120. The processing system 100 can be incorporated in any of a variety of electronic devices, such as a server, personal computer, tablet, set top box, gaming system, and the like. The processor 102 is generally configured to execute sets of instructions (e.g. computer programs) that manipulate the circuitry of the processor 102 to carry out defined tasks. The memory 120 facilitates the execution of these tasks by storing data used by the processor 102. The memory 120 can be random access memory (RAM), non-volatile memory such as flash memory or a hard disk drive (HDD), and the like, or a combination thereof.

In the course of executing the sets of instructions, the processor 102 generates memory access requests, including write requests to store data at the memory 120 and read requests to retrieve data from the memory 120. Each memory access request includes a memory address (e.g. a system physical address) indicating a location at the memory 120 targeted by the memory access request. In response to a read request, the memory 120 retrieves information (data or instructions) stored at the location corresponding to the memory address of the read request and provides the information to the processor 102. In response to a write request, the memory 120 stores write information of the request at the location corresponding to the memory address of the write request.

The processor 102 includes a security module 130. The security module 130 is a general purpose processor, field programmable gate array (FPGA), application specific integrated circuit (ASIC), mode of operation of a processor core, or other module designed and configured to perform security operations for the processing system 100, including registration of entities (e.g. virtual machines, computer programs, and the like) to be executed at the processor 102, generation and identification of security keys for the entities to be executed, authentication of the processing system 100 for security operations, and the like. In some embodiments, the security module 130 may undergo a secure registration process before it is permitted to execute its operations, and may have its operations restricted to security operations only, so that it cannot execute operations that leave it vulnerable to exploitation. As described further herein, the security module 130 supports the cryptographic isolation of information at the processing system 100 by generating the security keys, identifying the entities registered to be executed at the processing system 100, and other operations that enable such cryptographic isolation.

To facilitate execution of instructions, the processor 102 includes processor cores 104 and 106, caches 105, 107, and 108, a northbridge 110, and a security mode register 121. The processor cores 104 and 106 are processing units that individually and concurrently execute instructions. In some embodiments, each of the processor cores 104 and 106 includes an individual instruction pipeline that fetches instructions, decodes the fetched instructions into corresponding operations and, using the resources of the processing system 100, executes the operations, including memory access requests. Each of the processor cores 104 and 106 is configured to identify each memory access request as one of two types: a secure memory access request, indicating that the information corresponding to the memory access request is designated for cryptographic protection, or a non-secure memory access request, indicating that the information corresponding to the memory access request is not designated for cryptographic protection.

In some embodiments, the processing system 100 implements a security scheme whereby the security designation for information (whether the information is to by cryptographically protected) is assigned based on control bits included with the memory address corresponding to where the information is stored at the memory 120 or corresponding to the type of information (e.g. instructions or data). This allows large collections of data to be easily classified as secured information, providing for efficient information protection. For example, in some embodiments, the control bits are set by the processing system 100 so that particular types of information, such as instruction information, or page table information that provides a mapping of virtual addresses to physical addresses of the memory 120, are designated as secured information, thereby cryptographically protecting this information as described further below. The control bits for addresses assigned to data can be designated in a more fine-grained fashion based on, for example, designations requested by programs executing at the processor 102. This security scheme provides for protection of crucial data (preventing, for example, unauthorized execution of a virtual machine or its programs) while still providing flexibility for more general data.

In some embodiments, because the security type assigned to information is designated based on the information's corresponding memory address, the processing system 100 uses the page tables themselves to indicate the security type for each memory address. Accordingly, as described further below with respect to FIG. 3, the processor cores 104 and 106 identifies the type of memory access request in the course of identifying the memory address corresponding to the memory access request. In particular, if the memory address is indicated as storing secured information, the corresponding memory access is identified as a secure memory access. Similarly, if the memory address is indicated as storing non-secured information, the corresponding memory access is identified as a non-secure memory access.

The caches 105, 107, and 108 are memory devices that store subsets of the information stored at the memory 120, thereby providing the processor cores 104 and 106 quick access to the respective information subset. It will be appreciated that although for simplicity the cache 108 is illustrated as a single cache, in some embodiments the cache 108 can represent multiple caches, including different caches residing at different levels of a memory hierarchy of the processor 102. The cache 108 receives memory access requests and identifies whether its storage array (not shown at FIG. 1) stores information targeted by the memory access request. If so, the cache 108 indicates a cache hit and satisfies the memory access request at the storage array. If the cache 108 does not store the targeted information, it indicates a cache miss and provides the memory access request to the northbridge 110.

In the illustrated example of FIG. 1, the memory access path of the processing system 100 is such that the cache 108 stores information, including secure information, in an unencrypted form. Accordingly, as described further below with respect to FIG. 5, in some embodiments the cache 108 stores, for each storage location of a given size (e.g. a cache line), entity tag information identifying a particular program or other entity (e.g. a VM) that is authorized to access the information at the storage location. In response to a memory access to a location of the storage array, the cache 108 compares the identity of the entity that generated the memory access request to the entity tag information and, in response to a mismatch, indicates a cache miss, thereby preventing unauthorized access to the information.

The northbridge 110 is a memory controller that provides an interface for the processor 102 to communicate with the memory 120. In some embodiments, the northbridge 110 can perform other functions, such as interfacing with an input/output controller (e.g. a southbridge, not shown), and providing an interface between different processor cores (e.g. the processor cores 104 and 106 and other processor cores (not shown), such as a graphics processing unit. In its capacity as a memory controller, the northbridge 110 receives memory access requests from the cache 108 and controls provision of those requests to the memory 120. In addition, the northbridge 110 receives responses to memory access requests from the memory 120 and controls provision of the responses to the cache 108. In some embodiments, the northbridge 110 can receive memory access requests (e.g. direct memory access requests) from input/output devices (not shown) of the processing system 100 and controls their provision to the memory 120.

To provide for cryptographic isolation of information, the northbridge 110 includes an encryption module 115 configured to encrypt and decrypt information according to a specified cryptographic standard, and based on keys 126. In some embodiments, the encryption module 115 is configured to employ Advanced Encryption Standard (AES) encryption and decryption, but in other embodiments the encryption module 115 may employ other encryption/decryption techniques. In response to receiving a write request, the northbridge 110 identifies whether the request is a secure memory access request or a non-secure memory access request. If the write request is a non-secure memory access request, the northbridge 110 bypasses the encryption module 115 and provides the write request to the memory 120 without encrypting the information to be written. If the write request is a secure memory access request, the northbridge 110 identifies one of the keys 126 that is assigned to the entity (e.g. program, VM, software service, and the like) that generated the memory access request. In some embodiments, the security module 130 identifies the key to be selected based on which entity is currently being executed at the processor 102. The encryption module 115 employs the selected key to encrypt the information to be written and provides the write request, with the encrypted information, to the memory 120 for storage. In some embodiments, the encryption module 115 uses both the selected key and the physical address of the memory access request for encryption and decryption of the corresponding information thereby preventing block move attacks. In some embodiments, the encryption module 115 identifies whether to use the physical address for encryption and decryption based on the state of a control bit (not shown) at the processor 102. The control bit state can be set by the security module 130.

In response to receiving a read request, the northbridge 110 provides the request to the memory 120 and subsequently receives the information responsive to the request. If the northbridge 110 identifies the read request as a non-secure memory access request it bypasses the encryption module 115 and provides the read information to the cache 108 without encryption. If the northbridge 110 identifies the read request as a secure memory access request, it identifies one of the keys 126 that is assigned to the entity that generated the read access request and the encryption module 115 decrypts the read information. The northbridge 110 provides the decrypted read information to the cache 108 for storage. In some circumstances, the northbridge 110 may bypass provision of information to the cache 108 and provides the decrypted read information directly to the processor core that generated the corresponding read access request.

In some embodiments, the security mode register 121 is employed to control operation of the encryption module 115. The security mode register 121 includes a guard-mode-on field 122 and a guard-mode-active field 123. In response to the guard-mode-on field being in a specified state (e.g. a negated state), the northbridge 110 bypasses the encryption module 115 for all memory access requests, including secure memory access requests. This allows the processing system 100 to operate in a mode where encryption and decryption are bypassed for all programs being executed at the processor 102.

In response to the guard-mode-on field being in a different specified state (e.g. an asserted state), the northbridge 110 identifies a state of the guard-mode-active field. In response to the guard-mode-active field being in a specified state (e.g. a negated state) the northbridge 110 bypasses the encryption module 115 for received memory access requests (including secure memory access requests) and, in response to the guard-mode-active field being in a different state (e.g. an asserted state) bypasses the encryption module only for non-secure memory access requests. In some embodiments, the guard-mode-on field is set by an entity (e.g. a hypervisor) managing the execution of multiple individual programs or entities (e.g. VMs) at the processor 102 while the guard-mode-on field is set individually for each of the individual programs or entities. The security mode register thus allows the use of the encryption module 115 to be controlled at different levels of granularity.

Figure 2:
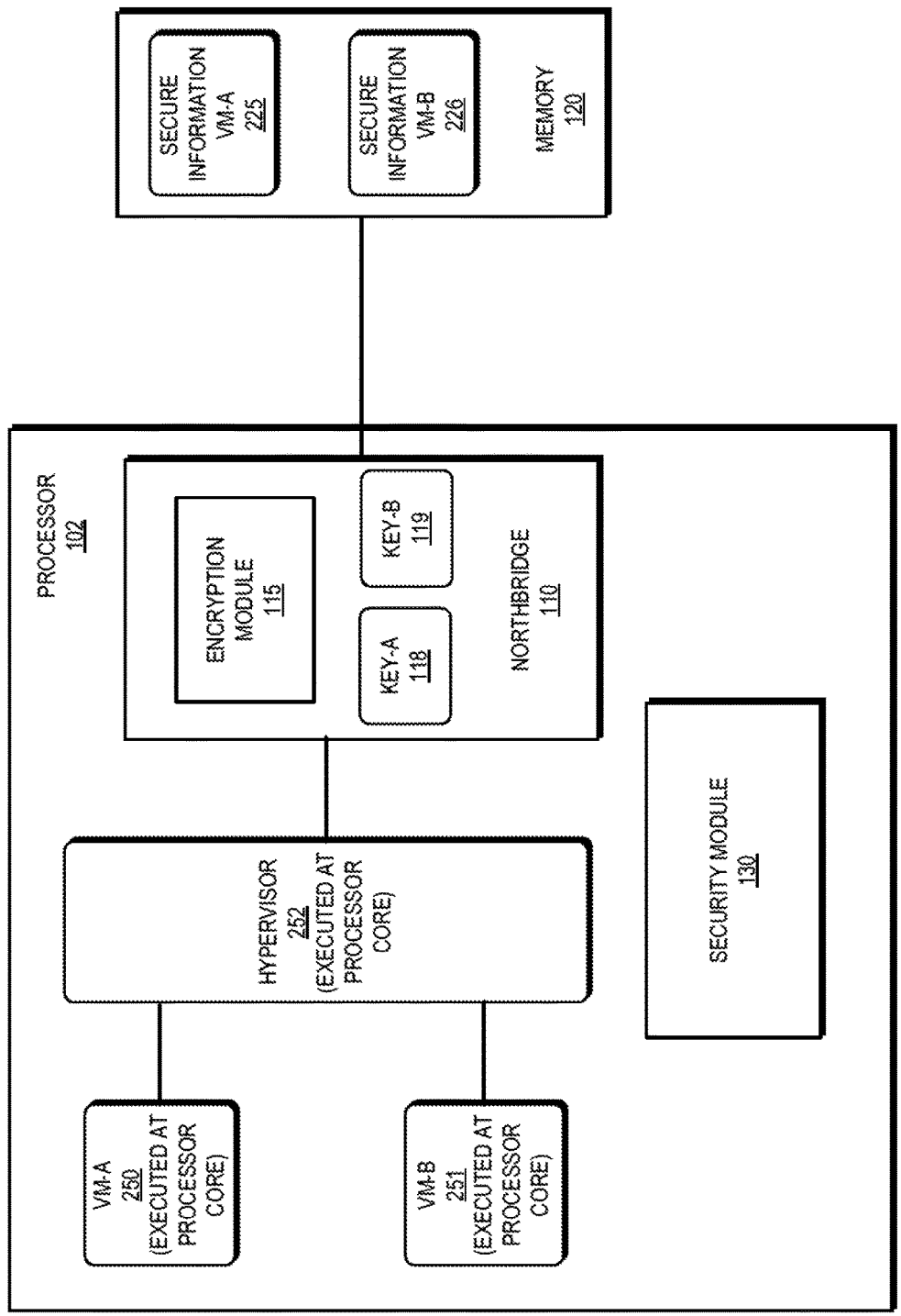
FIG. 2 is a block diagram illustrating an example implementation of the processing system of FIG. 1 to provide for isolation of virtual machines in accordance with some embodiments.

FIG. 2 illustrates, in accordance with some embodiments, an example operation of the processing system 100 to provide for cryptographic isolation of information for VMs. In the depicted example, the processor 102 is to concurrently execute a VM 250 and a VM 251. In addition, the processor 102 executes a hypervisor 252 to provide an interface between the VMs 250 and 251 and the hardware of the processing system 100. In the course of their execution, the VMs 250 and 251 are to access (store and retrieve) secure information 225 and 226 respectively. The encryption module 115 ensures that the secure information 225 and 226 are cryptographically isolated, so that they can only be accessed by their respective VM.

In operation, prior to being permitted to execute at the processor 102, each of the VMs 250 and 251 register with the security module 130. In some embodiments, a VM is registered as follows: the VM owner establishes a secure communication channel (not shown at FIG. 2) with the security module 130. An identification value, designated a "VMID" and a security key, designated a "VMKEY", are generated for the VM. This generation can be done at the security module 130 or at a separate security device and communicated to the security module 130 via the secure communication channel. The security module 130 ensures that each of the VMKEY and VMID values are unique to the corresponding VM. The VM owner encrypts an image of the corresponding VM and provides it to the hypervisor 252, which stores the encrypted image as secure data at the memory 120. Thus, in the illustrated example, the secure information 225 includes the VM image for the VM 250.

Subsequently, the processor 102 receives a request to execute a VM. In response to the request, the processor 102 notifies the security module 130 of the VMID for the requested VM. The security module 230 identifies, based on the VMID, the security key for the requested VM and provides the security key to the encryption module 115. In the illustrated example of FIG. 2, the processor 102 has received requests to execute both VMA 250 and 251, and the security module 130 has therefore provided key 118, for VMA 250, and key 119, for VMA 251, to the encryption module 115.

In the course of their execution, the VMs 250 and 251 generate memory access requests and provide them to the northbridge 110, which identifies, based on one or more bits included with the memory address of the request, whether the memory access request is a secure memory access request. If not, the northbridge 110 bypasses the encryption module 115 and satisfies the memory access request without encryption or decryption. If the memory access request is a secure memory access request, the northbridge 110 identifies, based on the memory address or other information provided with the memory access request, which of the VMs 250 and 251 generated the memory access request. The encryption module 115 selects the one of the keys 118 and 119 corresponding to the VM that generated the memory access request and performs encryption (in the case of a write request) or decryption (in the case of a read request) on the memory access information (the read data or the write data) using the selected key.

As described above, the cryptographic protection of data takes place at the northbridge 110 and the keys used for cryptographic protection are unknown and inaccessible to the VMs 250 and 251 and the hypervisor 252. This ensures that one VM cannot access the secure information for the other VM. For example, VM 251 may issue a memory access request to access secure information 225 (the secure information for VM 250). Because the memory access request was generated by VM 251, the encryption module 115 will attempt to decrypt the requested secure data with key 119, assigned to VM 251, rather than with key 118 that was used to encrypt the secure data. Accordingly, the VM 251 will not be able to meaningfully or correctly interpret the decrypted data, as it was decrypted using an incorrect key. The secure information 225 for the VM 250 is thus cryptographically isolated from access by the VM 251.

In some embodiments, the processing system 100 periodically changes the keys 118 and 119 to enhance security. For example, the security module 130 can generate a new key for a VM whenever the VM is fully shut down (not paused) to ensure the VM has the new key when it is restarted. For the VMs secure information stored at the memory 120 under the old key, the security module 130 can instruct the northbridge 110 to decrypt such information using the old key and re-encrypt the information using the new key, so that the secure information is accessible when the VM is restarted.

In some embodiments, the security module 130 can generate a new key for a VM in response to the VM entering a pause state. A portion of the VM (e.g. a guest operating system) maintains a data structure that identifies memory pages of the memory 120 that store encrypted data for the VM. In response to the VM entering the pause state, the security module 130 instructs the northbridge 110 to decrypt the identified memory pages using the old key, and re-encrypt the memory pages using the new key, thereby ensuring that the VM can access its secure information when it exits the pause state.

In some embodiments, the processing system 100 is not employed to execute multiple VMs for corresponding different customers, but instead can be placed in a mode (referred to for purposes of description as a "native mode") used in a single-user or single-customer environment. In such scenarios, the encryption module 115 at the northbridge 110 can be employed to cryptographically protect confidential information, as identified by one or more programs executed at the processor 102. The confidential information will therefore be stored in encrypted form at the memory 120. Even if the memory 120 is accessed in an unauthorized manner (e.g. via theft of the memory modules of the memory 120), the encrypted information cannot be meaningfully interpreted without knowledge of the key used to encrypt the information. The confidential information is therefore cryptographically protected from unauthorized access.

In some embodiments, as described further herein, special tag values (referred to as "VM tag values") are assigned to executing VMs to facilitate encryption or decryption. One of these tag values may be reserved for use in the native mode, so that information designated for encryption in the native mode cannot be accessed if the processing system 100 is subsequently used to execute VMs. In some embodiments, the native mode can be enabled by a designated control bit (not shown) at the processor 102, and can be used independently or in conjunction with execution of VMs at the processor 102.

In some embodiments, devices other than the processor 102 may employ the northbridge 110 to access the memory 120 through direct memory access (DMA) requests. In some embodiments, the northbridge 110 bypasses the encryption module 115 for all such DMA requests. In other embodiments, the processing system 102 may designate or reserve particular VM tag values for DMA requests, and any attempt by a DMA request to access secure information corresponding to a different VM tag may cause generation of an error notification at the processing system 102. This ensures that DMA requests cannot be used to bypass the cryptographic protection of information.

Figure 3:
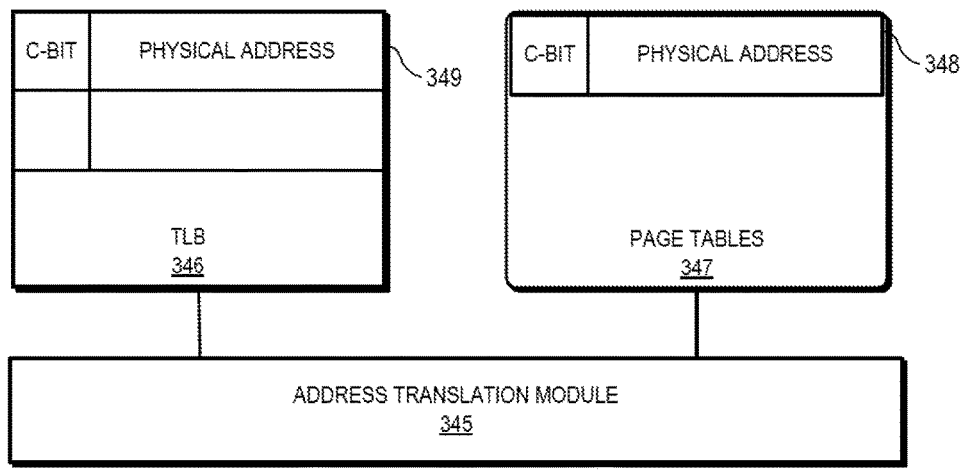
FIG. 3 is a block diagram illustrating the use of a translation lookaside buffer and page tables to identify secure memory accesses at the processing system of FIG. 1 in accordance with some embodiments.

FIG. 3 illustrates a portion of the processor 102 to enable identification of a security type (e.g. secured or non-secured) for memory access requests in accordance with some embodiments. In particular, FIG. 3 depicts an address translation module 345, a translation lookaside buffer (TLB) 346, and page tables 347. The address translation module 345 is a module generally configured to receive from one or both of the processor cores 104 and 106 virtual addresses for corresponding memory access requests. The address translation module 345 translates each received virtual address to a corresponding physical address that identifies the location of the memory 120 targeted by the memory access request.

The address translation module 345 employs one or both of the TLB 346 and the page tables 347 to translate a virtual address to a corresponding physical address. The page tables 347 include a plurality of entries (e.g. entry 348) indexed by virtual address. In some embodiments the page tables 347 are multi-level page tables, whereby lower-level pages include entries that identify other pages associated with the virtual address, with the highest level pages identify the physical address assigned to the virtual address. The physical address can be identified by traversing the page tables in a page walk, wherein the lowest level page is access first to identify the page at the next level that is to be accessed, and so on until the highest level page table that includes the physical address is identified and the physical address retrieved from that highest level page table. The highest level page tables also store a bit (designated the "C-bit") that indicates whether the data corresponding to the physical address is to be cryptographically protected. The TLB 346 includes a plurality of entries (e.g. entry 349) that together store a subset of the entries of the page tables 347 that reflect the virtual addresses recently received by the address translation module 345.

In response to receiving a virtual address, the address translation module 345 accesses the TLB 346 to determine whether it includes an entry corresponding to the virtual address. If so, the address translation module 345 appends the C-bit value to the physical address and provides the resulting physical address value to be used by the memory access request. The C-bit portion of the physical address value is used by the northbridge 110 to identify whether the memory access request is a secured memory access request. Thus, for example, if the C-bit in the physical address value is in an asserted state, the northbridge 110 identifies the corresponding memory access request as a secured memory access request, and uses the encryption module 115 to encrypt or decrypt the information corresponding to the request.

If the TLB 346 does not include an entry corresponding to the virtual address, the address translation module 345 retrieves the page tables 347 from the memory 120 and performs a search (sometimes referred to as a "page walk") of the page tables 347 for the entry corresponding to the virtual address. The address translation module 345 transfers the entry to the TLB 346, and provides the physical address value, including the C-bit, in response to the memory access request.

Because the page tables 347 and TLB 346 are used to store the C-bit, and therefore identify those memory access requests that are secured, secure information can be more easily and safely protected. For example, in some embodiments, those physical addresses corresponding to VM code can be designated as secure information by setting the C-bits at the corresponding page tables to the asserted state. This ensures that the VM code itself is cryptographically isolated. Further, the page tables for the VM can themselves be cryptographically protected by setting the corresponding C-bits to the asserted state. In some embodiments, the C-bits for the page tables are set unconditionally by hardware. In some embodiments, the VM itself may set the C-bits for other, non-executable information, providing flexibility for the VM to identify some data as non-protected, such as data that is to be directly accessed by input/output devices via direct memory access.

In some embodiments, rather than employing a C-bit in addition to a physical address value for each address, the processing system 100 repurposes an existing bit (e.g. the most significant bit) of each physical address for the C-bit value. The processing system 100 may also repurpose one or more bits of the physical address to store a VM tag value for the VM that is permitted to access cryptographically protected information. The repurposing of physical address bits saves silicon area at the potential cost of limiting the physical address space for the processing system 100. In some embodiments, the processor 102 may modify existing checks on physical addresses, such as can occur during a page walk, to accommodate the smaller address physical address space. For example, the processor 102 may employ physical addresses of 48 bits when information encryption is not enabled, and may employ physical addresses of 44 bits when information encryption is enabled, repurposing the other 4 bits for the C-bit and VM tag values. Accordingly, when information encryption is enabled, the processor 102 may generate an error indication in response to a program or hardware module referencing a physical address having more than 44 bits.

Figure 4:
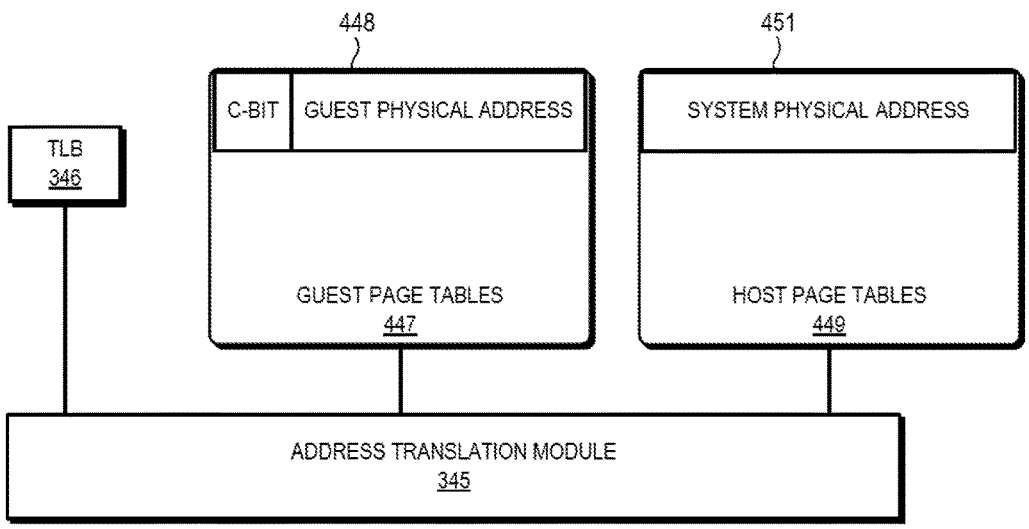
FIG. 4 is a block diagram illustrating the use of guest and host page tables to identify secure memory accesses at the processing system of FIG. 1 in accordance with some embodiments.

In some embodiments where the processor 102 executes VMs and a hypervisor, the address translation module 145 may access more than one level of page tables to identify the C-bit and the physical address to be used by the memory 120 (referred to for purposes of description of FIG. 4 as a "system physical address"). An example is illustrated at FIG. 4 in accordance with some embodiments. In the illustrated example, the address translation module 145 is configured to employ the TLB 346, guest page tables 447, and host page tables 449 (e.g. nested page tables) to identify the system physical address for a received virtual address.

The guest page tables 447 store a mapping of virtual addresses to a set of addresses, referred to as guest physical addresses. The guest physical addresses are not actual physical addresses of the memory 120, but rather represent intermediate addresses between the virtual address and the system physical addresses of the memory 120. The host page tables 449 store a mapping between the guest physical addresses and corresponding system physical addresses. The guest page tables 447 and host page tables 449 thus enable a layer of isolation and translation between the address space employed by, for example, a VM, and the address space employed by, for example a hypervisor. In the illustrated example of FIG. 4, the C-bit for an address is stored at the guest page tables 447, allowing a VM to control whether particular data is designated for cryptographic protection. This isolates the C-bit from the hypervisor, thereby protecting the cryptographic designation from exploitation by a buggy or malicious hypervisor.

In operation, the address translation module 345 receives a virtual address for a memory access and first identifies whether the TLB 346 stores a system physical address for the virtual address. If so, the address translation module 345 retrieves the system physical address and a corresponding C-bit from the TLB 346 and provides it to the northbridge 110. If the TLB 346 does not store the system physical address, the address translation module 345 identifies an entry (e.g. entry 448) of the guest page tables 447 assigned to the received virtual address. The address translation module 345 retrieves the C-bit value from the identified entry, and uses the guest physical address at the identified entry to perform a page walk at the host page tables 449. As a result of the page walk, the address translation module 345 identifies an entry (e.g. entry 451) of the host page tables 449 that is assigned to the guest physical address, wherein the entry stores a system physical address corresponding to the received virtual address. The address translation module 345 retrieves the system physical address and provides it, along with the C-bit retrieved from the corresponding entry of the guest page tables 447, to the northbridge 110 for further processing of the memory access request as described herein. In addition, the address translation module 345 stores the system physical address and the C-bit at an entry of the TLB 346 corresponding to the received virtual address. Thus, in the example of FIG. 4, the C-bit is provided by one set of page tables (the guest page tables 447) assigned to a VM while the physical address used to access the memory 120 is provided by a different set of page tables (the host page tables 449) assigned to the hypervisor.

Figure 5:
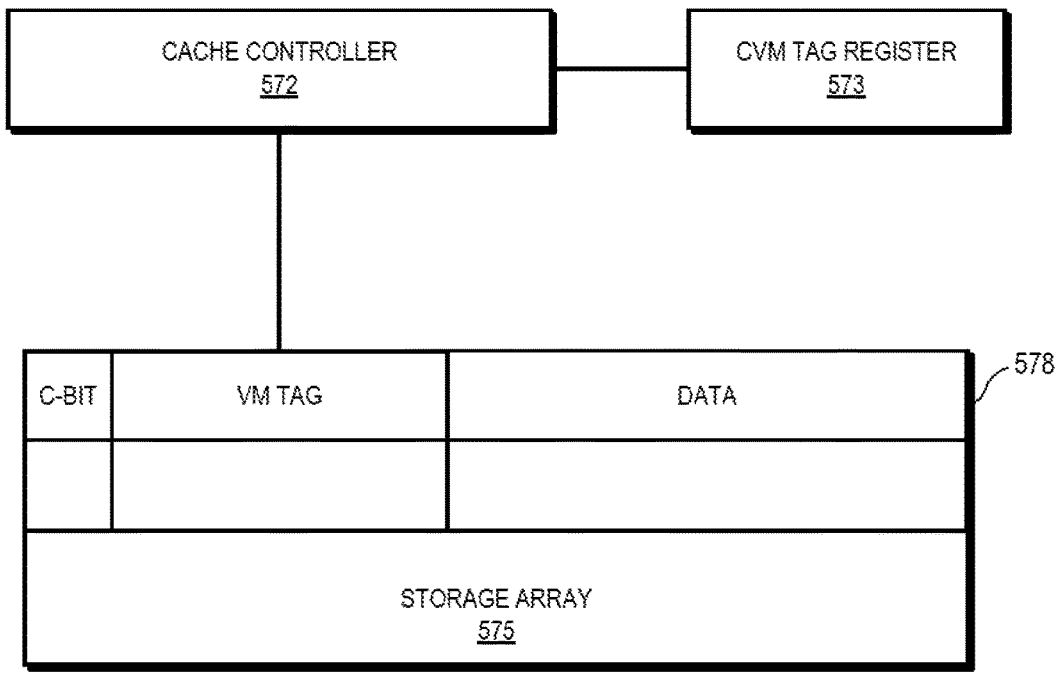
FIG. 5 is a block diagram illustrating the use of tags stored at the cache of FIG. 1 to isolate secure information in accordance with some embodiments.

FIG. 5 illustrates the cache 108 of the processor 102 of FIG. 1 in accordance with some embodiments. The cache 108 includes a cache controller 572, a CVM tag register 573, and a storage array 575. The storage array 575 includes a plurality of entries (e.g. entry 578) including a data field to store data for the entry, a VM tag field, indicating a VM tag value corresponding to the VM that is permitted to access the information stored at the data field, and a C-bit entry to store the C-bit that indicates whether the information is designated for cryptographic protection. The CVM tag register 473 stores the VM tag value for the VM currently being executed at the processor 102. In some embodiments, each of the processor cores 104 and 106 includes an individual CVM tag register indicating the VM tag value for the VM currently being executed at that core. In some embodiments, this value is set by processor core when it begins execution of a VM.

The data stored at the entries of the storage array 575 is not encrypted, as even the data designated for cryptographic protection has, prior to storage at the storage array 575, been decrypted at the encryption module 115. Accordingly, the cache controller 572 controls access to data at the storage array 575 to ensure that data designated for cryptographic protection is not accessed by an unauthorized entity. In particular, in response to receiving a memory access request, the cache controller 572 identifies, based on an address tag value derived from the memory access request address, whether one of the entries at the storage array 575 stores information targeted by the memory access request. If not, the cache controller 572 indicates a cache miss and provides the memory access request to the northbridge 110 for retrieval of the information.

If the storage array 575 does include an entry that stores information targeted by the memory access request, the cache controller 572 determines whether the C-bit for the entry is in an asserted state. If not, the information is not designated for cryptographic protection. Accordingly, the cache controller 572 indicates a cache hit and satisfies the memory access request, either by writing information to the entry (in the case of a write request) or retrieving and providing the information at the data field of the entry (in the case of a read request). If the C-bit is in an asserted state, the information is designated for cryptographic protection. Accordingly, the cache controller 572 compares the VM tag value at the entry's VM tag field to the VM tag value stored at the CMV ID value register 573. A match of the values indicates that the VM currently executing at the processor 102 is the VM that is authorized to access the information at the entry. Accordingly, in response to a match, the cache controller 572 indicates a cache hit and satisfies the memory access request. In response to a mismatch between the VM tag values, the cache controller 572 indicates a cache miss and does not satisfy the request. Accordingly, if the currently-executing VM is not authorized to access the information designated for cryptographic protection, the cache controller 572 prevents the access. This allows the storage array 575 to store simultaneously store information for different VMs while still isolating information from unauthorized access. In some embodiments the cache controller 572 may take additional action in response to identifying that the currently executing VM is not authorized to access the information, such as notifying the security module 130, which in turn may notify a supervisory entity of an attempted security breach.

Figure 6:
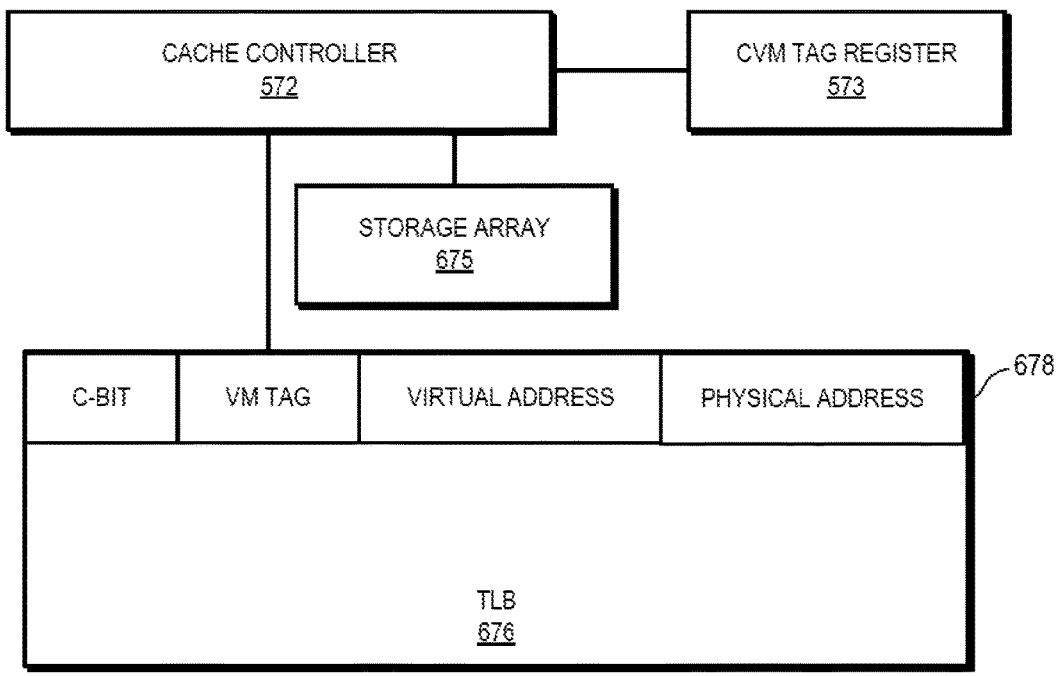
FIG. 6 is a block diagram illustrating the use of tags stored at TLB of the cache of FIG. 1 to isolate secure information in accordance with some embodiments.

FIG. 6 illustrates the cache 108 of the processor 102 of FIG. 1 in accordance with some embodiments wherein the VM tag values are stored in a TLB 676 employed to identify cache hits at the cache 108. The TLB 676 includes a plurality of entries (e.g. 678) with each entry corresponding to an entry of the storage array 675. Each entry of the TLB 676 stores the physical address of the corresponding entry of the storage array 675, the virtual address assigned to the physical address, the VM tag value indicating the VM that is authorized to access the information stored at the entry of the storage array 675, and a C-bit value to indicate whether the information is designated for cryptographic protection.

In response to receiving a memory access request, the address translation module 345 identifies whether any entry of the TLB 676 stores a virtual address that matches the virtual address of the memory access request. If not, the address translation module 345 performs a page table walk to identify a system physical address for the virtual address and creates a new TLB entry with this information. Once the TLB 676 includes an entry that stores information targeted by the memory access request, the cache controller 572 identifies whether the storage array 575 includes an entry that stores corresponding matching values for the C-bit value, system physical address, and VM tag values. If so, the cache controller 572 indicates a cache hit and satisfies the memory access request at the cache 108. If the storage array 575 does not include such an entry, the cache controller 572 indicates a cache miss and does not fulfill the memory access request. The cache controller 572 may also issue a memory request to a higher-level cache and/or to the northbridge 110 to retrieve the requested information.

In some embodiments, when an entry (e.g. a cache line) of the storage array 675 is evicted to allow for storage of other information, the cache controller 572 provides the information to be evicted, together with the stored C-bit and the VM tag value, as illustrated at entry 578 of FIG. 5, to the northbridge 110. In response, the northbridge 110 identifies whether the C-bit is in an asserted state and, if so, the encryption module 115 encrypts the information based on a key assigned to the VM tag value. The northbridge 110 then provides the information to the memory 120 for storage. If the C-bit is in a negated state, the northbridge 110 bypasses the encryption module 115 and provides the un-encrypted information to the memory 120 for storage.

In some scenarios, the hypervisor 252 (FIG. 2) needs to access VM information stored at the memory 120, or otherwise ensure that it can move such information from one memory location to another. However, such information may have been modified at the cache 108, and the hypervisor 252 is not able to access such information at the cache 108 because the hypervisor is not able to use the appropriate VM tag value. To avoid an incoherent view of memory and ensure the hypervisor 252 is able to access the (encrypted) copy of the most recent data, the hypervisor 252 may flush the entire storage array 675 of the cache 108, but this can have an undesirable impact on performance of the processor 102. Accordingly, in some embodiments the processor cores 104 and 106 can issue an operation requesting that the cache 108 flush entries at the storage array 575 associated with a VM tag value and address range identified by the operation. In response, the cache controller 572 flushes any entries at the storage array 675 that correspond to the VM tag value and address range. The northbridge 110 copies the flushed information to the memory 120, encrypting any information having its corresponding C-bit in an asserted state. The most up-to-date information is therefore available for access by the hypervisor 252 at the memory 120.

Figure 7:
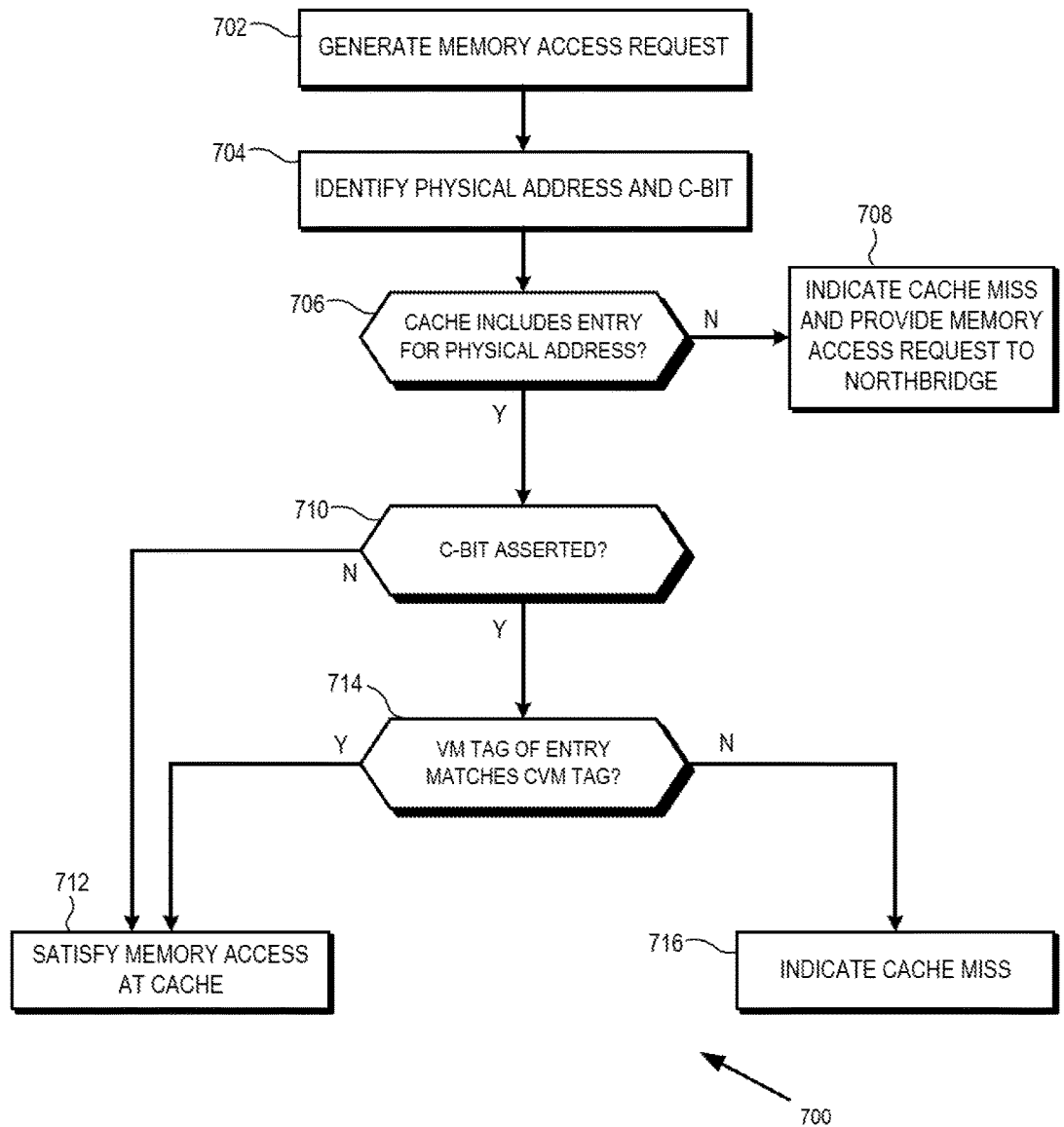
FIG. 7 is a flow diagram of a method of processing memory access requests at the cache of FIG. 1 to protect information designated for cryptographic protection in accordance with some embodiments.

FIG. 7 illustrates a flow diagram of a method 700 of processing memory access requests at a cache so as to protect information designated for cryptographic protection. For purposes of description, the method is described with respect to an example implementation at the cache 108 illustrated at FIG. 1 and FIG. 5. At block 702, one of the processor cores 104 and 106 generates a memory access request with a virtual address identifying the requested information. At block 704, the address translation module 345 (FIG. 3) employs the TLB 346 and the page tables 347 (or the TLB 346, guest page tables 447, and host page tables 449) to identify a system physical address corresponding to the virtual address and the C-bit value indicating whether the information at the physical address is designated for cryptographic protection. The address translation module 345 provides the system physical address value and the C-bit value with the memory access request to the cache 108.

At block 706 the cache controller 571 (FIG. 5) identifies, based on the physical address associated with the memory access request, whether an entry of the storage array 575 stores information targeted by the request. If not, the method flow proceeds to block 508 and the cache controller 572 indicates a cache miss. In addition, the cache controller 572 provides the memory access request, including the physical address value with the C-bit value, to the northbridge 110 for satisfaction. If an entry of the storage array 575 does store information targeted by the memory access request, the method flow proceeds to block 710 and the cache controller 572 identifies whether the C-bit for the identified entry is asserted. If not, the information at the identified entry is not designated for cryptographic protection. Accordingly, the method flow moves to block 712 and the cache controller 572 satisfies the memory access request by writing information to the data field of the identified entry or retrieving the information from the identified entry of the storage array 575.

Returning to block 710, if the cache controller 572 determines that the C-bit for the identified entry is set, the method flow moves to block 714 and the cache controller 571 determines whether the VM tag value at the identified entry matches the CVM tag value stored at the CVM tag register 573. If so, this indicates that the currently executing VM matches the VM that is authorized to access the information at the identified entry of the storage array 575. Accordingly, the method flow proceeds to block 712 and the cache controller 572 satisfies the memory access request using the information at the identified entry. If, at block 714, the cache controller determines that the VM tag value at the identified entry does not match the CVM tag value stored at the CVM tag register 573, the method flow moves to block 716 and the cache controller 771 indicates a cache miss. The cache controller 572 does not satisfy the memory access request, thereby protecting the information designated for cryptographic protection from unauthorized access.

Figure 8:
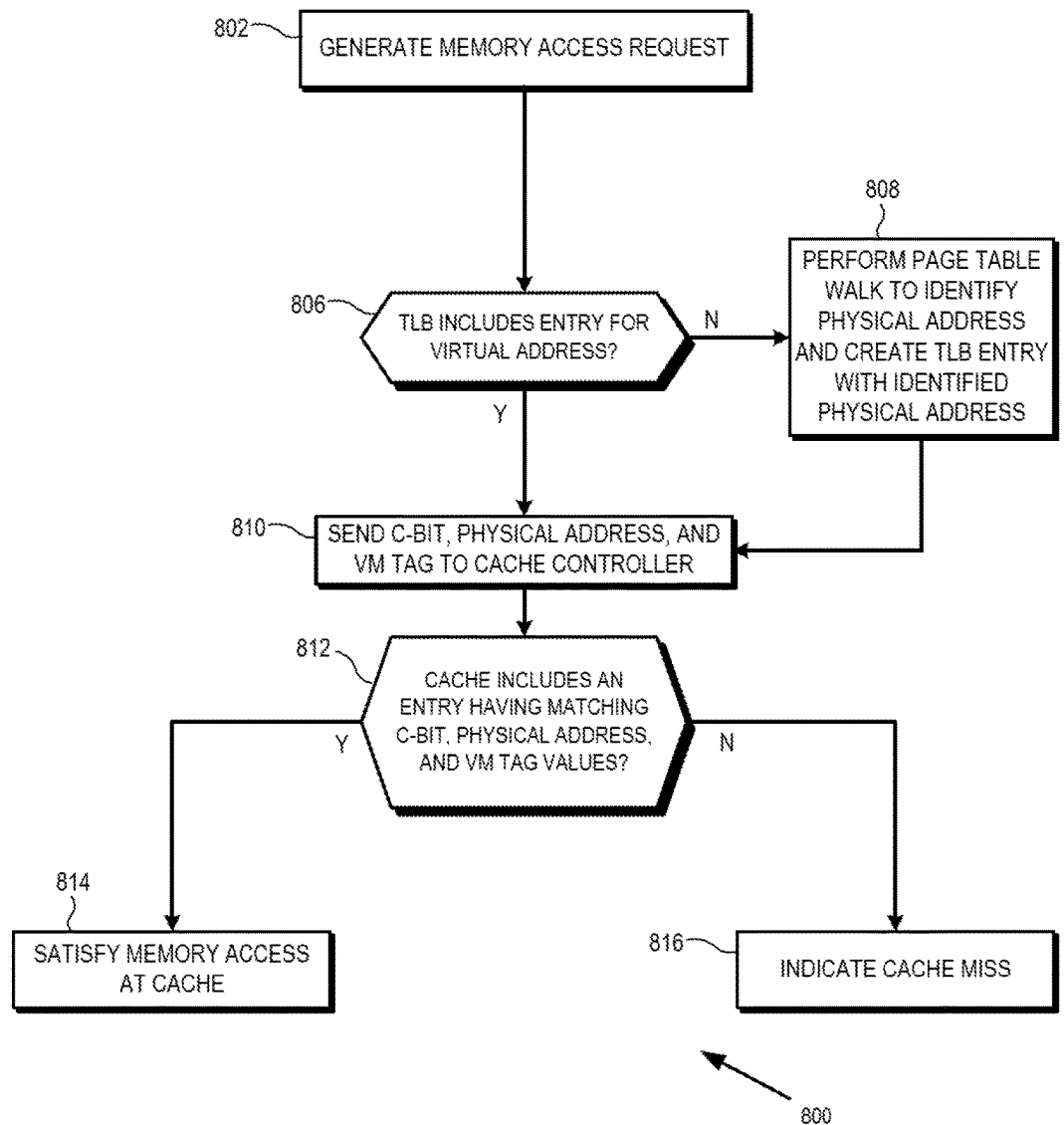
FIG. 8 is a flow diagram of a another method of processing memory access requests at the cache of FIG. 1 to protect information designated for cryptographic protection in accordance with some embodiments.

FIG. 8 illustrates a flow diagram of a method 800 of processing memory access requests at a cache using a TLB to identify information designated for cryptographic protection. For purposes of description, the method is described with respect to an example implementation at the cache 108 illustrated at FIG. 1 and FIG. 6. At block 802, one of the processor cores 104 and 106 generates a memory access request with a virtual address identifying the requested information.

At block 806 the TLB 676 identifies, based on the virtual address and VM tag value associated with the memory access request, whether it has an entry for the virtual address and VM tag value. If so, the method flow proceeds to block 810, described below. If not, the method flow proceeds to block 808 and the address generation unit 345 performs a table walk to identify a system physical address and the C-bit value for the virtual address. In addition, the TLB 676 obtains the VM tag value from the CVM tag register 573. The TLB 676 places the system physical address, virtual address, VM tag value, and C-bit value at one of its entries. The method flow proceeds to block 810 and the TLB 676 sends the C-bit value, system physical address, and VM tag value at the entry to the cache controller 572. At block 812 the cache controller 572 identifies whether the cache 108 includes an entry that stores corresponding matching values for the C-bit value, system physical address, and VM tag values. If so, the method flow proceeds to block 814 and the cache controller 572 indicates a cache hit and satisfies the memory access request at the cache 108. If, at block 812, the cache 108 does not include an entry that matches the C-bit values, VM tag values, or physical address values, the method flow proceeds to block 816 and the cache controller 572 indicates a cache miss. In addition, the cache controller 572 provides the memory access request, including the physical address value with the C-bit value and VM tag, to the northbridge 110 for satisfaction. The cache controller 572 does not satisfy the memory access request, thereby protecting the information designated for cryptographic protection from unauthorized access.

Figure 9:
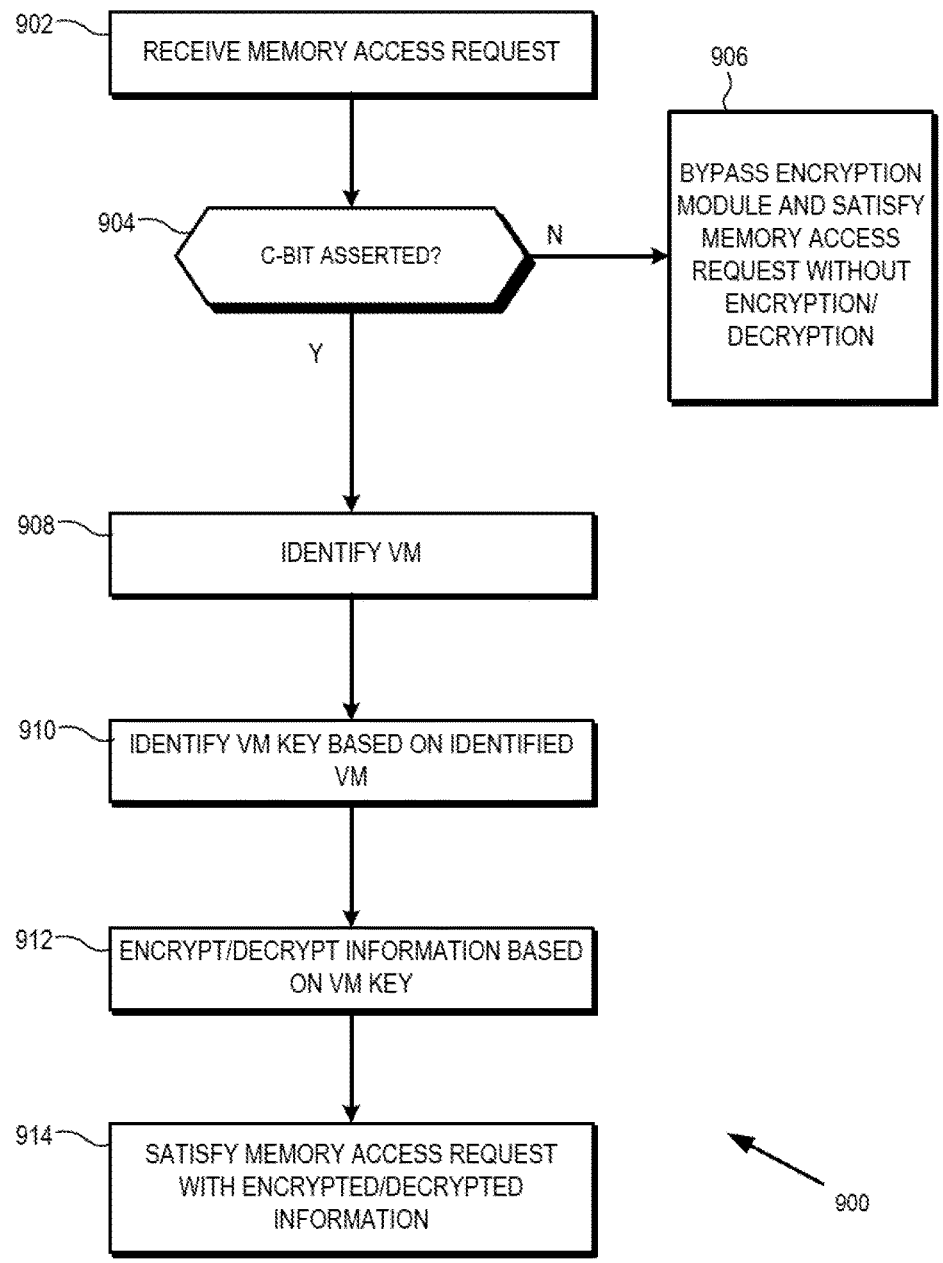
FIG. 9 is a flow diagram of a method of processing memory access requests at the northbridge of FIG. 1 to protect information designated for cryptographic protection in accordance with some embodiments.

FIG. 9 illustrates a flow diagram of a method 900 of processing memory access requests at a memory controller to protect information designated for cryptographic protection in accordance with some embodiments. For purposes of description, the method 900 is described with respect to an example implementation at the northbridge 110 of FIG. 1. At block 902, the northbridge 110 receives a memory access request from the cache 108. The memory access request may be a request generated by one of the processor cores 104 and 106, or a request generated on behalf of the cache 108 as it evicts and fills entries. As described above with respect to FIGS. 1-8, a physical address value for the memory access request, including a C-bit value indicating whether the memory access request is a secure memory access request, and a VM tag value have previously been identified by the address translation module 345.

At block 904, the northbridge 110 determines whether the C-bit for the memory access request is asserted. If not, the memory access request is a non-secure memory access request. Accordingly, the method flow moves to block 906 and the northbridge 110 bypasses the encryption module and satisfies the memory access request. Accordingly, in the case of a write request, the northbridge 110 does not encrypt the write information, so that the memory 120 stores the write information in unencrypted form. In the case of a read request, the northbridge 110 retrieves the information from the memory 120 and provides it to the cache 108 without decrypting the information. Note that if the retrieved information has previously been encrypted, it will not be meaningful or useful in its encrypted form. Accordingly, a malicious entity (e.g. hacking software) cannot achieve access to cryptographically protected information by attempting to access it with a non-secure memory request.

Returning to block 904, if the northbridge identifies that the C-bit for the memory access request is asserted, then the memory access request is a secure memory access request. Accordingly, the method flow moves to block 908 and the northbridge 110 identifies, based on the memory access request, the VM associated with the memory access request. At block 910 the northbridge 110 identifies one of the keys 126 corresponding to the identified VM. At block 912 the encryption module 115 encrypts or decrypts the information to be used to satisfy the memory access request. That is, if the memory access request is a write request, the encryption module 115 encrypts the information to be written. If the memory access request is a read request, the northbridge 110 retrieves the information to be read from the memory 120 and the encryption module 115 decrypts the retrieved information. At block 914 the northbridge 110 satisfies the memory access request using the encrypted (in the case of a write request) or decrypted (in the case of a read request) information.

Figure 10:
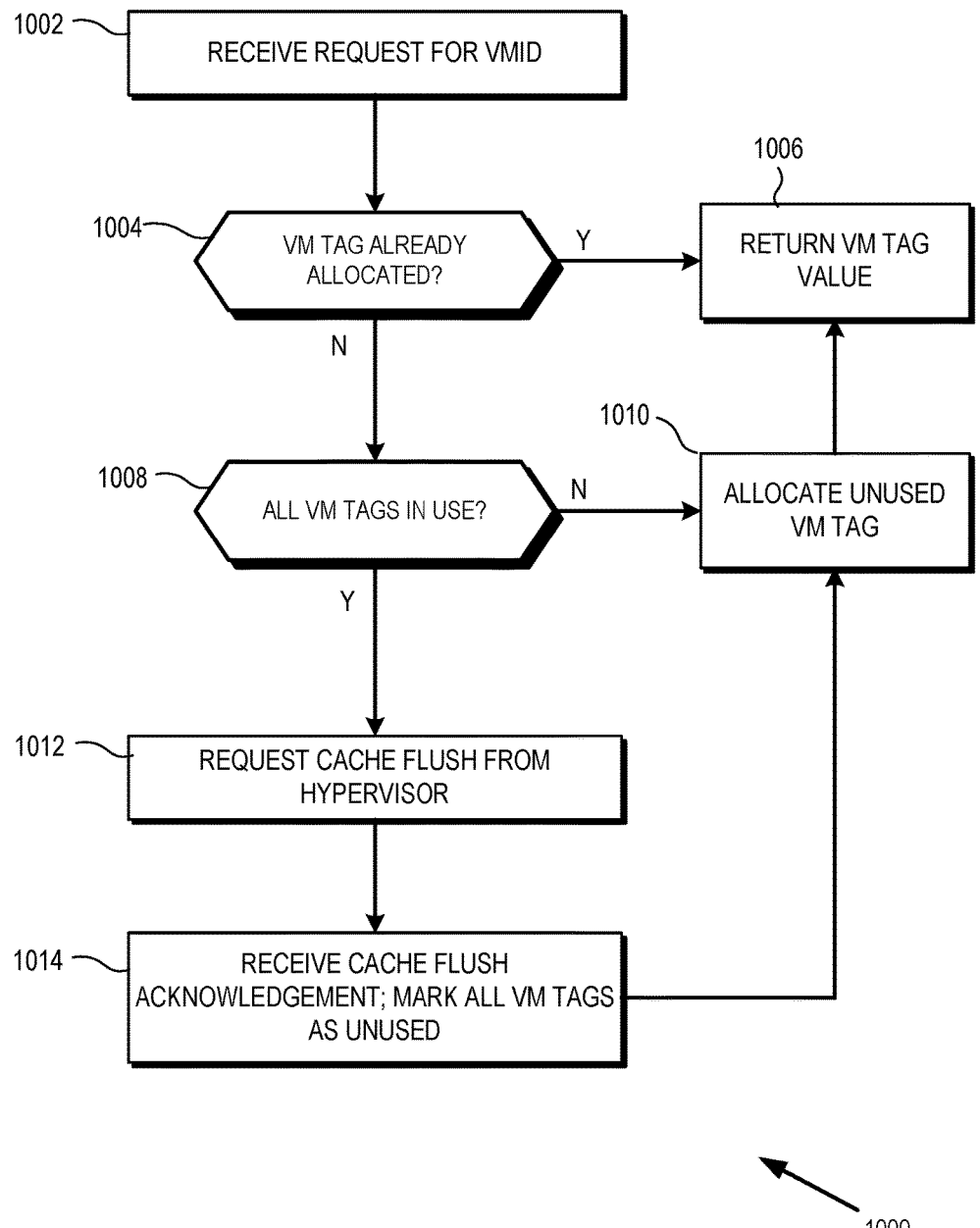
FIG. 10 is a flow diagram of a method of allocating VM identification values to enable cryptographic protection in accordance with some embodiments.

As described herein, in some embodiments VM tags (also referred to as VM tag values) are used to identify both the currently executing VM and the VM allowed to access information designated for cryptographic protection. In some scenarios, the number of VM tags available to be assigned is smaller than the number of VMs available to be executed. FIG. 10 illustrates a flow diagram of a method 1000 of allocating VM tag value in accordance with some embodiments. For purposes of description, the method 1000 is described with respect to an example implementation at the processing system 100 of FIG. 1 and FIG. 2, wherein the security module 130 manages generation and allocation of VM tag values.

At block 1002, the security module 130 receives a request from the hypervisor 252 for a VM tag, indicating that the hypervisor 252 is initiating execution of a VM at one or more of the processor cores 104 and 106. The hypervisor 252 provides the security module 130 with an identification value (sometimes referred to as a VMID value) for the VM to be executed. In response, at block 1004 the security module 130 accesses a stored table of allocated VM tags to identify whether a VM tag value has already been allocated to the VM. If so, the method flow proceeds to block 1006 and the security module 130 provides the already allocated VM tag value to the hypervisor 252. The VM tag value is thus available for use at, for example, the cache 108 to identify secure information for the executing VM.

Returning to block 1004, if a VM tag value has not already been assigned to the VM, the method flow proceeds to block 1008 and the security module 130 identifies whether all VM tag values are already assigned to other VMs. If not, the method flow moves to block 1010 and the security module 130 allocates a VM tag value to the VM and stores the VM tag value in the table of allocated VM tags. The method flow proceeds to block 1006 and the security module 130 provides the allocated VM tag value to the hypervisor 252.

Returning to block 1008, if the security module 130 identifies that all available VM tag values have been assigned, an already assigned VM tag must be re-allocated to the executing VM. However, this could allow the executing VM to access secure information at the cache 108 that it is not authorized to access. Accordingly, the method flow proceeds to block 1012 and the security module 130 requests the hypervisor 252 to flush the cache 108, thereby removing secured information from the cache 108 by causing all of the information to be written to the memory 120, in encrypted or unencrypted form as required by corresponding C-bit. At block 1014 the security module 130 receives acknowledgement from the hypervisor 252 that the cache 108 has been flushed, and in response the security module 130 marks all VM tags as unused. The method flow moves to block 1010 and the security module 130 allocates a new VM tag value to the VM and stores the VM tag value in the table of allocated VM tags. The method flow proceeds to block 1006 and the security module 130 provides the allocated VM tag value to the hypervisor 252.

In some embodiments, the apparatus and techniques described above are implemented in a system comprising one or more integrated circuit (IC) devices (also referred to as integrated circuit packages or microchips), such as the processor described above with reference to FIGS. 1-10. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 11:
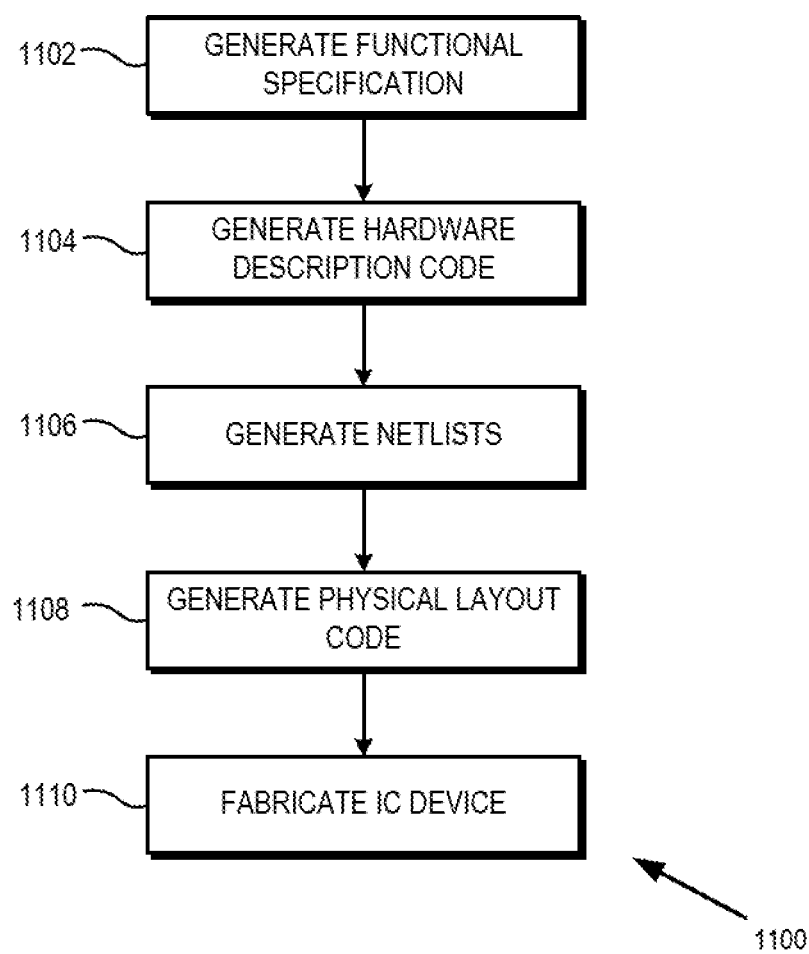
FIG. 11 is a flow diagram illustrating a method for designing and fabricating an integrated circuit device implementing at least a portion of a component of a processing system in accordance with some embodiments.

FIG. 11 is a flow diagram illustrating an example method 1100 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 1102 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1104, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1106 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1108, one or more EDA tools use the netlists produced at block 1106 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1110, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    generating, at a first processor core, a first memory access request comprising a virtual address identifying first requested information;
    in response to identifying, at a translation lookaside buffer (TLB), based on the virtual address and a virtual machine (VM) tag value associated with the first memory access request, that the TLB includes an entry for the virtual address and the VM tag value, sending a system physical address corresponding to the virtual address, the VM tag value, and an indication of whether the first requested information is designated for cryptographic protection to a cache controller for a cache; and
    in response to identifying, at the cache controller, that the cache includes an entry corresponding to the VM tag value, the system physical address, and the indication of whether the first requested information is designated for cryptographic protection, indicating a cache hit and satisfying the memory access request at the cache.

2. The method of claim 1, further comprising:
identifying that the first requested information is designated for cryptographic protection based on a bit included with the system physical address corresponding to the virtual address of the first memory access request.

3. The method of claim 2, further comprising:
identifying the bit included with the system physical address based on a page table including the system physical address.

4. The method of claim 1, further comprising:
in response to identifying the first requested information is designated for cryptographic protection:
identifying a key based on a virtual machine identification value that indicates a virtual machine that generated the first memory access request; and
wherein encrypting the first information comprises encrypting the first information based on the key.

5. The method of claim 4, further comprising:
receiving the key from a security module separate from the processor core.

6. The method of claim 1, wherein receiving the first memory access request comprises receiving the first memory access request via a hypervisor executing at the processor core.

7. The method of claim 1, further comprising:
receiving, at a memory controller, a second memory access request to write second requested information to memory; and
in response to identifying that the second requested information is not designated for cryptographic protection, providing the second requested information for storage at the memory without encrypting the second requested information at the memory controller.

8. The method of claim 1, further comprising:
indicating a cache miss in response to identifying that the cache does not include an entry corresponding to the VM tag value.

9. A method, comprising:
in response to receiving, at a memory controller of a processor, a first memory access request from a first virtual machine:
identifying a first key assigned to the first virtual machine;
encrypting, at the memory controller, first information associated with the first memory access request based on the first key;
in response to receiving, at a cache of the processor, a second memory access request, the second memory access request comprising a virtual address identifying the first information and in response to identifying, at a translation lookaside buffer (TLB), based on the virtual address and associated with the second memory access request, that the TLB includes an entry for the virtual address and the virtual machine tag value, sending a system physical address corresponding to the virtual address, the virtual machine tag value, and an indication that the first information is designated for cryptographic protection to a cache controller for a cache; and
in response to identifying at the cache controller, that the cache includes an entry corresponding to the virtual machine tag value, the system physical address, and the indication that the first information is designated for cryptographic protection, providing access to the encrypted first information by indicating a cache hit and satisfying the second memory access request at the cache.

10. The method of claim 9, further comprising:
in response to receiving, at the memory controller, a third memory access request from a second virtual machine:
identifying a second key assigned to the second virtual machine; and
decrypting second information associated with the third memory access request based on the first key.

11. The method of claim 9, further comprising:
indicating a cache miss in response to identifying that the cache does not include an entry corresponding to the virtual machine tag value.

12. The method of claim 9, wherein:
encrypting the first information comprises encrypting the first information in response to identifying that the first information is designated for cryptographic protection based on a bit included with a system physical address corresponding to the virtual address of the first memory access request.

13. A processor, comprising:
a processor core to generate a first memory access request comprising a virtual address identifying first requested information;
a translation lookaside buffer (TLB) to identify, based on the virtual address and a virtual machine (VM) tag value associated with the first memory access request, that the TLB includes an entry for the virtual address and the VM tag value; and
a cache controller for a cache to receive from the TLB a system physical address corresponding to the virtual address, the VM tag value, and an indication of whether the first requested information is designated for cryptographic protection and to indicate a cache hit and satisfy the memory access request at the cache in response to identifying that the cache includes an entry corresponding to the VM tag value, the system physical address, and the indication of whether the first requested information is designated for cryptographic protection.

14. The processor of claim 13, wherein:
the indication of whether the first requested information is designated for cryptographic protection comprises a bit included with the system physical address corresponding to the virtual recess of the first memory access request.

15. The processor of claim 14, further comprising:
an address generation unit to identify the bit included with the system physical address based on a page table including the system physical address.

16. The processor of claim 13, further comprising:
a memory controller to, in response to receiving the first memory access request from a first virtual machine, identify a first key assigned to the first virtual machine and to encrypt the first requested information associated with the first memory access request based on the first key.

17. The processor of claim 13, wherein the cache controller is to:
indicate a cache miss in response to identifying that the cache does not include an entry corresponding to the virtual machine tag value.

* * * * *

UNITED STATES PATENT AND TRADEMARK OFFICE
CERTIFICATE OF CORRECTION

PATENT NO. : 9,792,448 B2
APPLICATION NO. : 14/494643
DATED : October 17, 2017
INVENTOR(S) : David A. Kaplan et al.

Page 1 of 1

It is certified that error appears in the above-identified patent and that said Letters Patent is hereby corrected as shown below:

In the Claims

At Column 19 Line 53, please correct "address and associated with" to be --address and a virtual machine tag value associated with--

At Column 19 Line 61, please correct "response to identifying at the" to be --response to identifying, at the--

At Column 20 Line 47, please correct "the virtual recess of the" to be --the virtual address of the--

Signed and Sealed this
Eighth Day of October, 2019

Andrei Iancu
*Director of the United States Patent and Trademark Office*